United States Patent [19]

Smith

[11] 4,326,118
[45] Apr. 20, 1982

[54] LASER BEAM WELDING APPARATUS

[76] Inventor: Jack J. Smith, 50 Pine Dr., Wokingham, England

[21] Appl. No.: 173,134

[22] PCT Filed: Mar. 21, 1979

[86] PCT No.: PCT/GB79/00049
§ 371 Date: Nov. 19, 1979
§ 102(e) Date: Nov. 19, 1979

[87] PCT Pub. No.: WO79/00807
PCT Pub. Date: Oct. 18, 1979

[51] Int. Cl.³ .............................................. B23K 27/00
[52] U.S. Cl. ........................ 219/121 LC; 219/121 LD
[58] Field of Search ............... 219/121 CC, 121 LD, 219/121 LQ, 121 LT, 121 LR, 121 LU, 121 LY, 121 L, 121 LM, 121 EC, 121 ED, 121 LX; 269/25, 287

[56] References Cited

U.S. PATENT DOCUMENTS

| | | | |
|---|---|---|---|
| 3,949,186 | 4/1976 | Nakayama et al. | 219/121 LD X |
| 3,953,706 | 4/1976 | Harris et al. | 219/121 LH |
| 4,001,543 | 1/1977 | Bove et al. | 219/121 LC |
| 4,073,483 | 2/1978 | Smith | 269/25 |
| 4,080,525 | 3/1978 | Gobetz | 219/121 LQ X |
| 4,088,865 | 5/1978 | Peters et al. | 219/121 LT X |
| 4,223,202 | 9/1980 | Peters et al. | 219/121 L |

*Primary Examiner*—C. L. Albritton
*Attorney, Agent, or Firm*—Oblon, Fisher, Spivak, McClelland & Maier

[57] ABSTRACT

Laser beam welding apparatus for effecting a weld along a part-circular path, the apparatus is intended for use in welding end flanges to semicylindrical shells to form semi-cylindrical journal bearings, particularly those having a flange at each end. The apparatus includes a laser source (11) and pair of rotatably mounted housings (17) each supporting a laser nozzle (18), one on each side of a center line (32). Either nozzle (18) can be selected for operation by moving a mirror (13) in and out of the laser beam as is necessary when welding a flange at each end of the shell. Workpieces are held in jigs (39) in jig means (38) and are accommodated by moving the housings (17) towards and away from the center line (32). Welds of different radii may be achieved by moving the nozzle (18) radially with respect to the axis of rotation of the housings (17).

9 Claims, 1 Drawing Figure

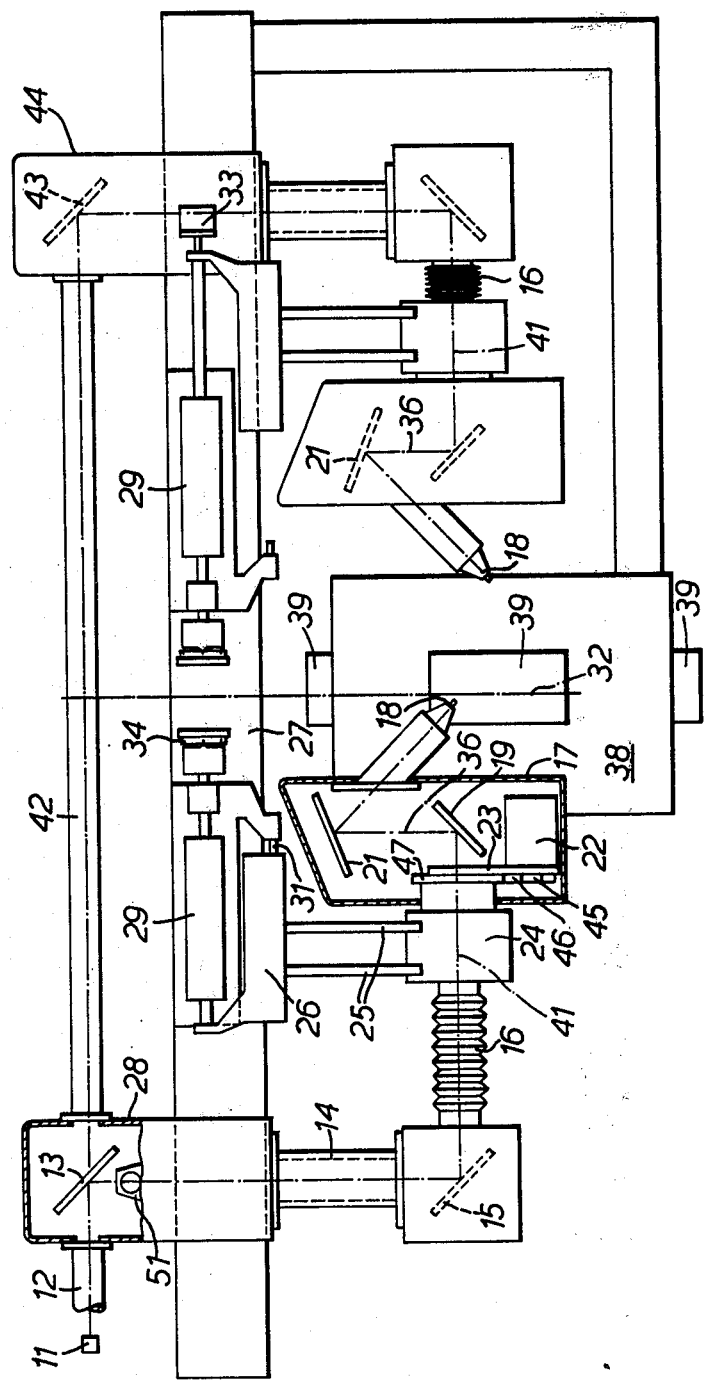

LASER BEAM WELDING APPARATUS

TECHNICAL FIELD

This invention relates to laser beam welding apparatus designed for effecting a weld along a part-circular path, for example, in the manufacture of semi-cylindrical journal bearings having an end flange welded to one end of a semi-cylindrical shell.

BACKGROUND ART

It is known to provide laser beam welding apparatus for effecting a weld along a part-circular path. However, such apparatus would not be suitable for welding flanges to bearing shells in a high speed continuous process since it is necessary to locate the workpieces very accurately with respect to each other and to the beam in order to achieve the required levels of tolerance, and this accuracy must be achieved in all the finished products.

DISCLOSURE OF THE INVENTION

According to the present invention laser beam welding apparatus comprises means for directing a laser beam along a reference axis to a housing carrying a laser nozzle and reflectors for supplying the beam to the nozzle, a motor arranged to rotate the housing and the nozzle about the reference axis, characterised in that apparatus further contains jig means arranged to hold a workpiece in a fixed position relative to the reference axis.

The rotation about the reference axis is conveniently through an angle of 180° to effect the semi-circular weld referred to above, and there may be means for adjusting the position of the nozzle radially in relation to the reference axis in accordance with the radius of the weld that is to be made in a particular case.

The type of bearing described above frequently has an end flange at each end of the semi-cylindrical journal shell, and accordingly the apparatus may have a second similar housing spaced from the first housing along the reference axis so that the workpiece can be positioned between the two nozzles, and each can be driven by its motor to effect a weld between a flange and the corresponding end of the semi-cylindrical shell.

It is preferred that the welds are not carried out simultaneously but consecutively, and accordingly the same beam may be used for both welds by having means for directing the beam alternately to the nozzle in the one housing, and the nozzle in the other housing. Such means conveniently comprises a retractable mirror which can be inserted into and withdrawn from the path of the incoming laser beam.

One or each housing can be adjustable in the direction of the reference axis to vary the spacing between the two nozzles in accordance with the dimensions of the workpiece.

It will be appreciated that the apparatus can be arranged to be operated automatically in continuous cycles, each of which consists of putting a loaded jig in the space between the nozzles, making the weld at one end of the bearing by rotating one nozzle through 180°, and then directing the beam to the other nozzle so that the second weld can be made by rotating the motor at that end, after which the jig is unloaded. A convenient arrangement with two or more jigs on a table or movable arm will enable one jig to be emptied of a welded bearing and loaded with new components while the other jig is having its components welded.

The invention includes a method of producing a semi-cylindrical bearing comprising a shell with a flange at one end, the method comprising directing a laser beam along a reference axis to a housing, reflecting the beam to a laser nozzle carried by the housing and rotating the housing and the nozzle through 180° about the reference axis to weld the flange to the one end of the shell characterised by holding the workpiece in jig means in a fixed position relative to the reference axis.

BRIEF DESCRIPTION OF DRAWINGS

The single FIGURE is a schematic elevation of laser beam welding apparatus designed for welding half-annular end flanges to a semi-cylindrical journal shell as described in British Pat. No. 46708/76 (Case 637).

BEST MODE FOR CARRYING OUT THE INVENTION

A laser beam projected from a source 11 travels through a tube 12 to be capable of striking a mirror 13 which reflects the beam through a further tube 14 to a mirror 15 whence it is reflected through an extensible tube 16 to a rotatable housing 17 which houses a laser nozzle 18 and a pair of co-operating reflectors 19 and 21, and a motor 22 and gearing 23 arranged to rotate the housing about the axis of the beam (the reference axis 41) in the tube 16. The housing 17 can rotate in a bearing 24 through which the tube 16 directs the laser beam, and which is itself carried by a pair of arms 25 from a saddle 26 on a mounting beam 27 extending throughout the length of the apparatus, and carrying at its lefthand end a housing 28 for the mirror 13, and the tube 14 for leading the laser beam to the mirror 15. The saddle 26 is in fact mounted from the beam through a hydraulic actuator 29 which can be extended to move the saddle 26, the bearing 24, and the housing 17 with its laser nozzle 18 to the left in the drawing from an extreme position defined by a stop 31 in which the nozzle 18 is substantially on the centre line 32 of the apparatus to a position in which it is closely adjacent the housing of the mirror 15, and in that position the tube 16 is contracted.

There is a similar set of components on the other side of the centre line, and in the drawing that set of components is shown with the actuator 29 fully extended against a stop 33 and the tube 16, whose centre line lies on the reference axis 41 is shown fully contracted. A micrometer device 34 enables the position of the nozzle 18 to be accurately adjusted axially.

In the condition shown on the left of the centre line, the laser beam is directed from the nozzle 18 to a point which cuts the centre line 32 substantially on the reference axis 41, but the mirror 21 is mounted on an actuator having a shaft at 36 and can be moved to the position shown on the right in FIG. 1 in which the nozzle 18 is displaced substantially away from the reference axis 41.

The apparatus is designed for welding to a semi-cylindrical journal shell, a half annular flange at each end of the shell in the manner described in British Pat. No. 46708/76 (Case 637), and for that purpose the components are held in jig means 38 comprising a number of jigs 39 substantially as described with reference to British Pat. No. 2398/76 (Case 648). The jig means 38 is positioned generally between the two nozzles 18, and is fixed relative to the beam 27 so that it is also fixed relative to the reference axis 41.

The distance between the two nozzles can be set by operation of the two actuators 29 in accordance with the width of the assembly of shell and end flanges, and the radial displacement of the nozzles 18 from the reference axis 41 can be set by operation of the actuators 36 to agree with the radius of the end flanges where the laser beam weld is to be made.

The line of weld will be a semi-circle and the nozzle 18 can be turned through an appropriate semi-circle by driving the motor 22. Stops (not shown) are provided for limiting the movement of the nozzle 18 at the end of its semi-circular path.

The end flanges are firmly assembled with the semi-cylindrical shell in the jig, and then the first flange to the left of the centre line 32 is welded to the shell in the manner described above. Then the mirror 13 is moved out of the plane of the drawing by an actuator 51 so that the laser beam from the source 11 is not reflected down the tube 14, but is reflected along the tube 42 to a mirror 43 in a housing 44 also mounted on the beam 27 and corresponding to the housing 28. Operation of the motor 22 to the right of the centre line then enables a similar semi-circular weld to be effected at that side of the bearing shell so that welding of the three components together is completed.

The two welding operations can be performed very quickly under automatic control, and then the jig 39 holding the welded workpiece can be swung out of the welding position to allow a similar jig 39 previously loaded with three more bearing components to be swung into the welding position for welding up those components while the already welded bearing assembly is removed from its jig as a finished article, and three more components can be loaded into the now empty jig 39.

The machine described, in conjunction with the jigs described in Specification No. 2398/76, enables bearings made by the method described in Specification No. 46708/76, to be produced rapidly in a continuous process.

The speed of movement of the laser nozzles 18 around their circular paths is conveniently 1 to 2"/sec. The gearing 23 can be arranged automatically to maintain that speed along the semi-circular arc in spite of movements of the nozzles 18 to be at different radii from the bearing axis which will coincide with the reference axis 41. Thus movement of a nozzle 18 radially can be accompanied by an automatic re-setting of the gear ratio between the motor 22 and the housing 17.

In one convenient arrangement the motor 22 drives a planet wheel 45 in relation to an intermediate gear 46 which itself meshes with a sun gear 47 fixed to the bearing 24.

I claim:

1. Laser beam welding apparatus comprising means for directing a laser beam along a reference axis to a housing carrying a laser nozzle and reflectors for supplying the beam to the nozzle, a motor arranged to rotate the housing and the nozzle about the reference axis, and jig means arranged to hold a workpiece in a fixed position relative to the reference axis, characterised by a second housing carrying a second laser nozzle and reflectors for supplying the beam to the second nozzle and a second motor arranged to rotate the second housing and the second nozzle about the reference axis, the second housing being spaced from the first housing along the reference axis, and in which the jig means is arranged to locate the workpiece in the space between the two housings.

2. Apparatus as claimed in claim 1 characterised in that the housing is arranged to rotate about the reference axis through an angle of 180° to effect a semi-circular weld.

3. Apparatus as claimed in claim 1 or claim 2 characterised by means for adjusting the position of the nozzle radially in relation to the reference axis in accordance with the radius of the weld.

4. Apparatus as claimed in claim 3 characterised by means for directing the beam alternately to the first nozzle and to the second nozzle.

5. Apparatus as claimed in claim 4 characterised in that the directing means comprises a mirror movable between a position in the path of the beam and a position outside the path of the beam.

6. Apparatus as claimed in claim 4 or claim 5 characterised in that at least one of the first and second housing is adjustable in the direction of the reference axis in order to vary the spacing between the nozzles in accordance with the dimentions of the workpiece.

7. Apparatus as claimed in claim 6 characterised in that the jig means comprises a plurality of jigs arranged so that the workpiece in the first jig is welded while the remaining jigs are emptied of their welded workpiece and loaded with new components.

8. A method of producing a semi-cylindrical bearing comprising a shell with a flange at one end, the method comprising directing a laser along a reference axis to a housing, reflecting the beam to a laser nozzle carried by the housing and rotating the housing and the nozzle through 180° about the reference axis to weld the flange to the one end of the shell characterised by holding the workpiece in jig means in a fixed position relative to the reference axis.

9. A method of producing a semi-cylindrical bearing comprising a shell with a flange at each end, the method comprising the method of claim 8 characterised by subsequently directing the beam along the reference axis to a second housing, reflecting the beam to a second laser nozzle carried by the second housing and rotating the second housing and the second nozzle through 180° about the reference axis to weld a second flange to the other end of the shell.

* * * * *

UNITED STATES PATENT AND TRADEMARK OFFICE
CERTIFICATE OF CORRECTION

PATENT NO. : 4,326,118
DATED      : April 20, 1982
INVENTOR(S) : Jack J. Smith

It is certified that error appears in the above—identified patent and that said Letters Patent is hereby corrected as shown below:

Please insert the following:

[30] -- Foreign Application Priority Data

March 21, 1978   [UK] .....11196/78 --

*Signed and Sealed this*

*Twenty-first* Day of *September 1982*

[SEAL]

*Attest:*

GERALD J. MOSSINGHOFF

*Attesting Officer*     *Commissioner of Patents and Trademarks*